June 3, 1952 A. H. J. DE LASSUS SAINT-GENIES 2,598,676
APPARATUS FOR ELIMINATING THE LINEAR TEXTURE OF A PICTURE
IN PROJECTION AND IN OPTICAL PRINTING BY PROJECTION
Filed Feb. 29, 1948
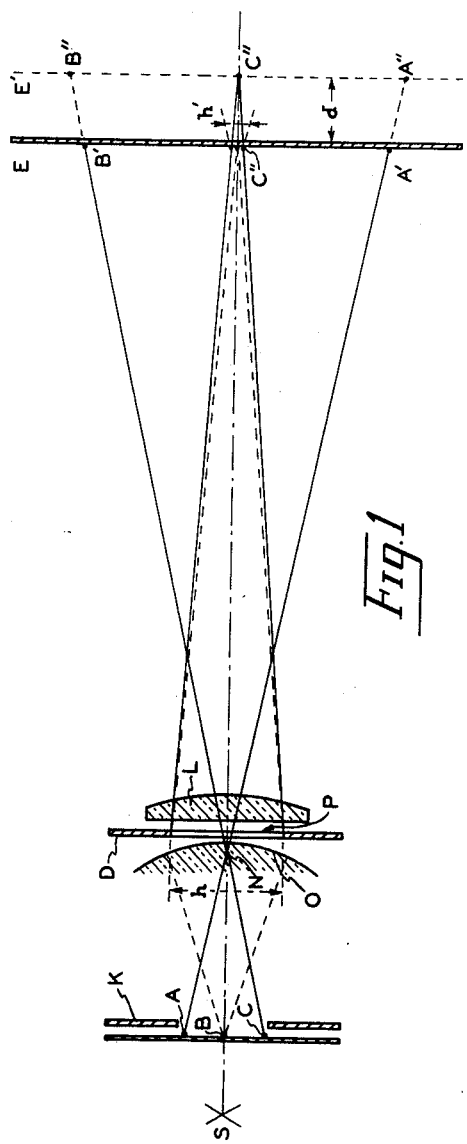
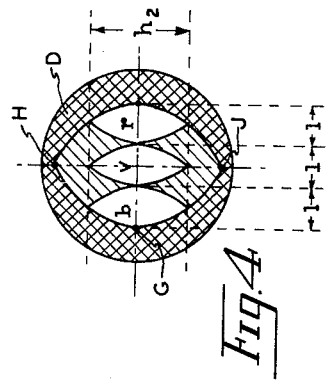
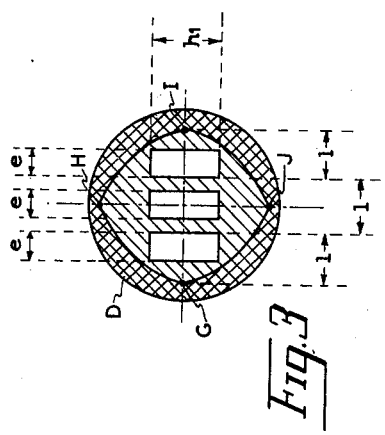
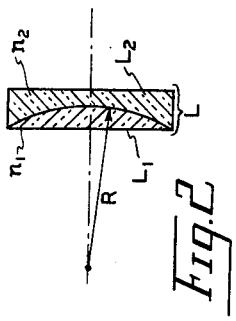
INVENTOR
A. H. J. de LASSUS S$^T$ GENIES
BY *William R. Liberman*
ATTORNEY Patented June 3, 1952

2,598,676

UNITED STATES PATENT OFFICE 2,598,676

APPARATUS FOR ELIMINATING THE LINEAR TEXTURE OF A PICTURE IN PROJECTION AND IN OPTICAL PRINTING BY PROJECTION

Anne Henri Jacques de Lassus Saint-Genies, Versailles, France

Application February 29, 1948, Serial No. 12,206
In France November 12, 1941

Section 1, Public Law 690, August 8, 1946
Patent expires November 12, 1961

9 Claims. (Cl. 88—24)

The present invention relates generally to systems for eliminating the lineated structure of a lineated film, when the film is projected and more particularly to systems for projecting images from lineated film, which may for example be lenticular, in homogeneous texture, and with optimum detail, and in which optical effects due to the lineations or lenticulations are avoided.

The invention applies to processes of projecting pictures from a lineated or lenticulated moving picture film onto a plane screen, or onto a screen which is itself lenticulated or which includes cylindrical optical elements, or onto a further lenticular film for purposes of copying, or, in general, onto any surface whatever.

In accordance with known systems of projecting from lineated film, a main and an auxiliary optical system are employed. The main optical system projects the image with optimum definition, overall. The auxiliary optical system destroys the sharpness of the image in the direction transverse to the lineations, so that a clear picture devoid as nearly as possible, of moiré effect, may be obtained. This objective may be accomplished by means of an auxiliary optical system comprising a cylindrical lens having its generatrix parallel to the lineations.

In accordance with the present system, on the other hand, while the ultimate objective to be attained is the same as in the known prior system, an entirely different procedure is followed. The image is defocused in all directions by the main optical system, to the extent required to obtain elimination of lineated structure in the image. The auxiliary lens restores the focus in the direction of its lineation by means of a cylindrical lens. Thereby, the diffusion of any point of the image which is produced by the main optical system transversely of the lineations is maintained, but the diffusion parallel to the lineations is removed. The latter function is accomplished by means of a cylindrical lens having its generatrix perpendicular to the lineations.

It is, accordingly, a broad object of the invention to provide a novel system for projecting lineated images, with removal of the lineations.

It is a more specific object of the invention to provide a novel system for projecting images from lenticular film, with elimination of moiré effect due to the lenticulations.

It is still a more specific object of the invention to provide a system for accomplishing each of the above stated objectives by initially projecting the images in defocused relation in all direction, by means of a main optical system, and for refocusing the image only in the direction of the lineations by means of an auxiliary optical system.

The above and still further objects, features and advantages of the present invention will be made apparent upon consideration of the following detailed description of a specific embodiment thereof, especially when taken in conjunction with the accompanying drawings, wherein:

Figure 1 is a view in section taken on the main optical axis of the present system, the section being taken parallel to the lineations;

Figure 2 is a view in section taken parallel to the lineations of a projected lineated image of an improved auxiliary lens system for use in the present invention; and Figures 3 and 4 are views in section of diaphragms comprising tri-chrome filters for use in the invention.

Referring now more specifically to Figure 1 of the accompanying drawings, the line ABC is a line parallel to lineations in a film, and may represent a transverse section taken through a film. The film may be of the type having lenticulations in the primary colors, which are intended to be projected as a colored image. To this end K represents the film gate of a projecting machine, S a source of light, and O a projection objective lens having a nodal point N. P then represents the tri-chrome filter normally employed in systems of the type here involved, and illustrated in detail in Figures 3 or 4 of the accompanying drawings, and is supported in a diaphragm D. E is a surface on which a colored image is to be projected from the film ABC, and it is desired, by means of the present system, to delete from the projected image any moiré effect, or lineations, produced by the lineated or lenticular character of the film ABC.

To accomplish the object of the invention the objective lens O is designed to project the image deriving from the film ABC to a plane E', rather than to the surface E, i. e. to project the image of a point C of the film ABC to the focal point C''. It follows that the point C as seen at the surface E, i. e. at C', is diffused, the diffusion area being represented at C', and having a height $h'$ in the direction of the lineations of the original image, and also in a direction at right angles to the lineations (not shown).

Since the film ABC is lineated or lenticular in three primary colors, every point of the original film produces three adjacent colored spots, in the absence of defocusing, but sufficient defocusing is introduced to suppress completely any lineated structure at the surface E by diffusing the colored spots into one another.

The auxiliary cylindrical lens L is then disposed between diaphragm D and surface E, with its generatrix perpendicular to the direction of the lineations of the film ABC, and with its axis on the axis of the overall optical system. The focal length and optical properties of the lens L are then so selected as to eliminate the diffusion in the direction of the lineations, without affecting the diffusion transversely of the lineations.

In Figure 2 is disclosed a particular and preferred embodiment of the auxiliary lens system L consisting of two lens elements $L_1$ and $L_2$ having the same radius of curvature, and the material of the two lens elements $L_1$ and $L_2$ having only slightly different values of refractive index, $n_1$ and $n_2$. Such lenses are known to have a very long focal distance.

It is known in the art, particular reference being made to the French patent to Blondell #787,200 of June 11, 1934 and to the second addition thereof dated May 15, 1935, that the shape of a projection filter for use in a system of projection of color lenticular film, must be shaped roughly in the form of an ellipse, in order to ensure maximum utilization of the largest aperture of a projection objective lens. In Figures 3 and 4, for example, the outline of a suitable lens, in accordance with the prior art, is delineated at G, H, I, J. The diaphragm must then prevent passage of light deriving from the objective lens, over areas corresponding with the cross hatched portions of Figures 3 and 4.

If, now, in accordance with the present invention, a diffusion of image points at surface E is to occur, in respect to a direction transverse of the lenticulations of the film ABC, but not in a direction parallel to these lenticulations, additional requirements exist in the design of the diaphragm.

If a point C is to be projected with maximum sharpness to a point C'' of an imaginary plane E', diffusion will exist in two directions at the surface E, i. e. in the direction A' B' and in a direction at right angles to A' B', or transversely of the lineations. The latter must be equal to the projected pitch of the lenticulations.

To this end the diaphragm D may be blocked over the hatched portions, leaving three openings $b$, $v$, $r$, for rays of three different primary colors, of identical width $e$, suitable to provide the desired diffusion, and of proper height $h_1$. Only in such case will each elementary area taken transversely of the lenticulations appear on the surface E in blended relation, and without any lienations, over the entire width of the surface E, since only in this way will all the apertures provide superposition of identical amounts of light, in the direction A' B', over the entire surface E.

The systems of Figures 3 and 4 illustrate two aperture shapes which may be employed to provide equal light values in each of the primary colors, at each position of the surface E, and either the embodiment of Figure 3 or of Figure 4 may be employed, as desired.

While I have described and illustrated a specific and preferred embodiment of my invention it will be clear that variations of detail and of structural arrangement may be resorted to, without departing from the true spirit and scope of the invention as defined in the appended claims.

What I claim is:

1. A system for projecting on an image receiving surface an image contained on a translucent color film which has cylindrical corrugations running in a predetermined direction, comprising, an optical system having a focal length, a source of light, means for projecting said light through said translucent color film to said image receiving surface, via said optical system, the relative distances of said translucent color film, said optical system, and said image receiving surface, and said focal length being such that each point of said image on said translucent color film is defocused in all directions sufficiently to eliminate from said image as it appears on said image receiving surface all lineated structure due to said cylindrical corrugations, and a further cylindrical lens system for restoring the sharpness of adjacent points of said image as they appear on said image receiving surface, said adjacent points taken solely in said predetermined direction.

2. The system in accordance with claim 1 wherein said cylindrical lens system consists of two cylindrical lenses having the same radii of curvature, one of said cylindrical lenses being plano-convex and the other plano-concave, said cylindrical lenses having respective convex and concave surfaces adjacent, and having respectively different indices of refraction.

3. A system for eliminating the linear texture of an image projected from cylindrically corrugated color film, where said linear texture is caused by the cylindrical corrugations of said color film, comprising, a first optical system for projecting said image toward said image receiving surface in defocused relation in all directions on said image receiving surface sufficiently to remove said lineated texture, and a further cylindrical lens system intermediate said first optical system and said image receiving surface for further projecting said image toward said image receiving surface while effecting refocusing only of adjacent points of said image taken in the direction of said cylindrical corrugations.

4. The system in accordance with claim 3 wherein said cylindrical lens system comprises a cylindrically plano-convex lens and a cylindrically plano-concave lens, said last mentioned lenses having identical radii of curvature and different indices of refraction, and having generatrices perpendicular to said cylindrical corrugations.

5. A system for projecting on an image receiving surface an image contained on a translucent film which has cylindrical corrugations running in a predetermined direction, comprising, an optical system having a focal length, a source of light, means for projecting said light through said translucent film to said image receiving surface, via said optical system, the relative distances of said translucent film, said optical system, said image receiving surface, and said focal length, being such that each point of said image on said translucent film is defocused in all directions sufficiently to eliminate from said image as it appears on said image receiving surface all lineated structure due to said cylindrical corrugations, and a further cylindrical lens system for restoring the sharpness of adjacent points of said image as it appears on said image receiving surface, said adjacent points taken solely in said predetermined direction.

6. The system in accordance with claim 1 wherein said cylindrical lens system consists of two cylindrical lenses having the same radii of curvature, one of said cylindrical lenses being plano-convex and the other plano-concave, said cylindrical lenses having respective convex and concave surfaces adjacent, and having respectively different indices of refraction.

7. A system for eliminating the linear texture of an image on cylindrically corrugated film upon projection of said image to an image receiving surface, comprising, a first lens system for transmitting said image toward said image receiving surface in sufficiently defocused relation in all directions to remove said linear texture, and a second lens system for refocusing adjacent points of said image on said image receiving surface, said adjacent points taken only in the direction of the cylindrical corrugations of said film.

8. A system for eliminating the linear texture of an image projected from lineated film, where said linear texture is caused by the lineations of said film, comprising, a first optical system for projecting said image toward said image receiving surface in sufficiently defocused relation in all directions on said image receiving surface to eliminate said linear texture, and a further cylindrical lens system intermediate said first optical system and said picture receiving surface for further projecting said picture toward said picture receiving surface in refocused relation only in the direction of said lineations, said further lens system having generatrices perpendicular to said lineations.

9. The system in accordance with claim 3 wherein said cylindrical lens system comprises a cylindrically plano-convex lens and a cylindrically plano-concave lens, said last mentioned lenses having identical radii of curvature and different indices of refraction, and having generatrices perpendicular to said lineations.

ANNE HENRI JACQUES DE LASSUS
ST. GENIES.

REFERENCES CITED

The following references are of record in the file of this patent:

UNITED STATES PATENTS

| Number | Name | Date |
|---|---|---|
| 2,159,420 | Blondel | May 23, 1939 |